US012768306B2

(12) United States Patent
Gourishankar et al.

(10) Patent No.: US 12,768,306 B2
(45) Date of Patent: Oct. 20, 2026

(54) OXYGEN REDUCTION SYSTEM FOR A HYDROCARBON FLUID

(71) Applicant: General Electric Company, Schenectady, NY (US)

(72) Inventors: Karthick Gourishankar, Bengaluru (IN); Arundhati Sengupta, Bengaluru (IN); Narayanan Janakiraman, Bengaluru (IN); Sanjay Kumar Sondhi, Bengaluru (IN); Vasanth Srinivasa Kothnur, Mason, OH (US); Hejie Li, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 49 days.

(21) Appl. No.: 18/323,604

(22) Filed: May 25, 2023

(65) Prior Publication Data

US 2024/0253014 A1 Aug. 1, 2024

(30) Foreign Application Priority Data

Jan. 27, 2023 (IN) ............................. 202311005480

(51) Int. Cl.

| | |
|---|---|
| ***F02C 9/26*** | (2006.01) |
| ***F02C 7/22*** | (2006.01) |
| ***F23K 5/08*** | (2006.01) |

(52) U.S. Cl.

CPC .................. *F02C 9/26* (2013.01); *F02C 7/22* (2013.01); *F23K 5/08* (2013.01); *F23K 2900/05082* (2013.01)

(58) Field of Classification Search

CPC ...... F02C 7/22; F02C 9/26; F02C 3/24; F23K 5/08; F23K 2900/05082; F23R 2900/00004; B64D 37/34; F02M 37/22

See application file for complete search history.

(56) References Cited

U.S. PATENT DOCUMENTS

| | | | |
|---|---|---|---|
| 5,284,994 | A | 2/1994 | Brown et al. |
| 5,725,756 | A | 3/1998 | Subramaniam et al. |
| 5,820,747 | A | 10/1998 | Lenglet et al. |

(Continued)

OTHER PUBLICATIONS

Beaver, et al., High Heat Sink Jet Fuels. Part 1. Development of Potential Oxidative and Pyrolytic Additives for JP-8, 2006, Energy & Fuels, 20, 1639-1646 (Year: 2006).*

(Continued)

*Primary Examiner* — Devon C Kramer
*Assistant Examiner* — Jingchen Liu
(74) *Attorney, Agent, or Firm* — Venable LLP; David D. Leege; Michele V. Frank

(57) ABSTRACT

A hydrocarbon fluid system including a hydrocarbon fluid conduit and an oxygen gettering assembly. The hydrocarbon fluid conduit has a fluid passage through which hydrocarbon fluid flows. The hydrocarbon fluid includes oxygen and has an oxygen content. The oxygen gettering assembly is disposed relative to the hydrocarbon fluid conduit such that an oxygen getter comes into contact with the hydrocarbon fluid as the hydrocarbon fluid flows through the fluid passage to reduce the oxygen content of the hydrocarbon fluid. The oxygen gettering assembly may be a part of a deoxygenation system that also includes a sparging system. The hydrocarbon fluid may be a fuel used in a gas turbine engine.

13 Claims, 8 Drawing Sheets

(56) References Cited

U.S. PATENT DOCUMENTS

| | | | |
|---|---|---|---|
| 5,891,584 A | 4/1999 | Coffinberry | |
| 6,315,815 B1 * | 11/2001 | Spadaccini | B01D 61/00 96/6 |
| 7,326,469 B2 | 2/2008 | Dye et al. | |
| 9,334,806 B2 | 5/2016 | Carter et al. | |
| 10,428,429 B2 | 10/2019 | Hong et al. | |
| 10,683,807 B2 | 6/2020 | McMasters et al. | |
| 10,844,788 B2 | 11/2020 | Zhang et al. | |
| 11,193,420 B2 * | 12/2021 | Dardas | F02C 7/236 |
| 11,352,960 B2 | 6/2022 | Mancini et al. | |
| 2005/0180901 A1 * | 8/2005 | Vanderspurt | C10G 53/14 422/612 |
| 2017/0107960 A1 * | 4/2017 | Opalka | B01J 23/10 |
| 2020/0086239 A1 * | 3/2020 | Cordatos | B01D 19/0021 |
| 2020/0140114 A1 | 5/2020 | Andrews, Jr. et al. | |
| 2020/0141575 A1 * | 5/2020 | O'Connor | F02C 3/20 |
| 2021/0170317 A1 * | 6/2021 | Janikowski | B01D 39/16 |
| 2022/0228247 A1 | 7/2022 | Kool et al. | |

OTHER PUBLICATIONS

West, Determination of Hydroperoxides in Jet Fuel via Reaction with Triphenylphosphine, 2005, Industrial & Engineering Chemistry Research, 44, 3377-3383 (Year: 2005).*

Tamboli, Triphenylphosphine Oxide Removal from Reactions: The Role of Solvent and Temperature, 2021, ACS Omega, 6, 13940-13945 (Year: 2021).*

Beaver-Development of Oxygen Scavenger Additives for Future Jet Fuels (Year: 2000).*

Beaver et al., "Model Studies Directed at the Development of New Thermal Oxidative Stability Enhancing Additives for Future Jet Fuels," Energy & Fuels, vol. 11, No. 2, 1997.

Morris et al., "Fuel Deoxygenation and Aircraft Thermal Management," 4th International Energy Conversion Engineering Conference and Exhibit (IECEC), Jun. 26-29, 2006.

Spadaccini et al., "On-Line Fuel Deoxygenation for Coke Suppression," Turbo Expo 2002 ASME Turbo Expo: Land, Sea & Air 2002, Jun. 3-6, 2002.

* cited by examiner

OXYGEN REDUCTION SYSTEM FOR A HYDROCARBON FLUID

CROSS REFERENCE TO RELATED APPLICATIONS

The present application claims the benefit of Indian Patent Application No. 202311005480, filed on Jan. 27, 2023, which is hereby incorporated by reference herein in its entirety.

TECHNICAL FIELD

The present disclosure relates to hydrocarbon fluid systems, such as fuel systems, particularly, hydrocarbon fluid systems for gas turbine engines for aircraft.

BACKGROUND

Gas turbine engines include surfaces that contact hydrocarbon fluids, such as fuels and lubricating oils. Carbonaceous deposits (also known as coke) may form on these surfaces when exposed to the hydrocarbon fluids at elevated temperatures, resulting in carbon becoming attached to and building up as deposits on surfaces contacted by a fuel or oil.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 5A is a schematic, cross-sectional view of a first configuration of the oxygen gettering assembly. FIG. 5B is a schematic, cross-sectional view of a second configuration of the oxygen gettering assembly. FIG. 5C is a schematic, cross-sectional view of a third configuration of the oxygen gettering assembly. FIG. 5D is a schematic, cross-sectional view of a fourth configuration of the oxygen gettering assembly. FIG. 5E is a schematic, cross-sectional view of a fifth configuration of the oxygen gettering assembly.

DETAILED DESCRIPTION

Figure 1:
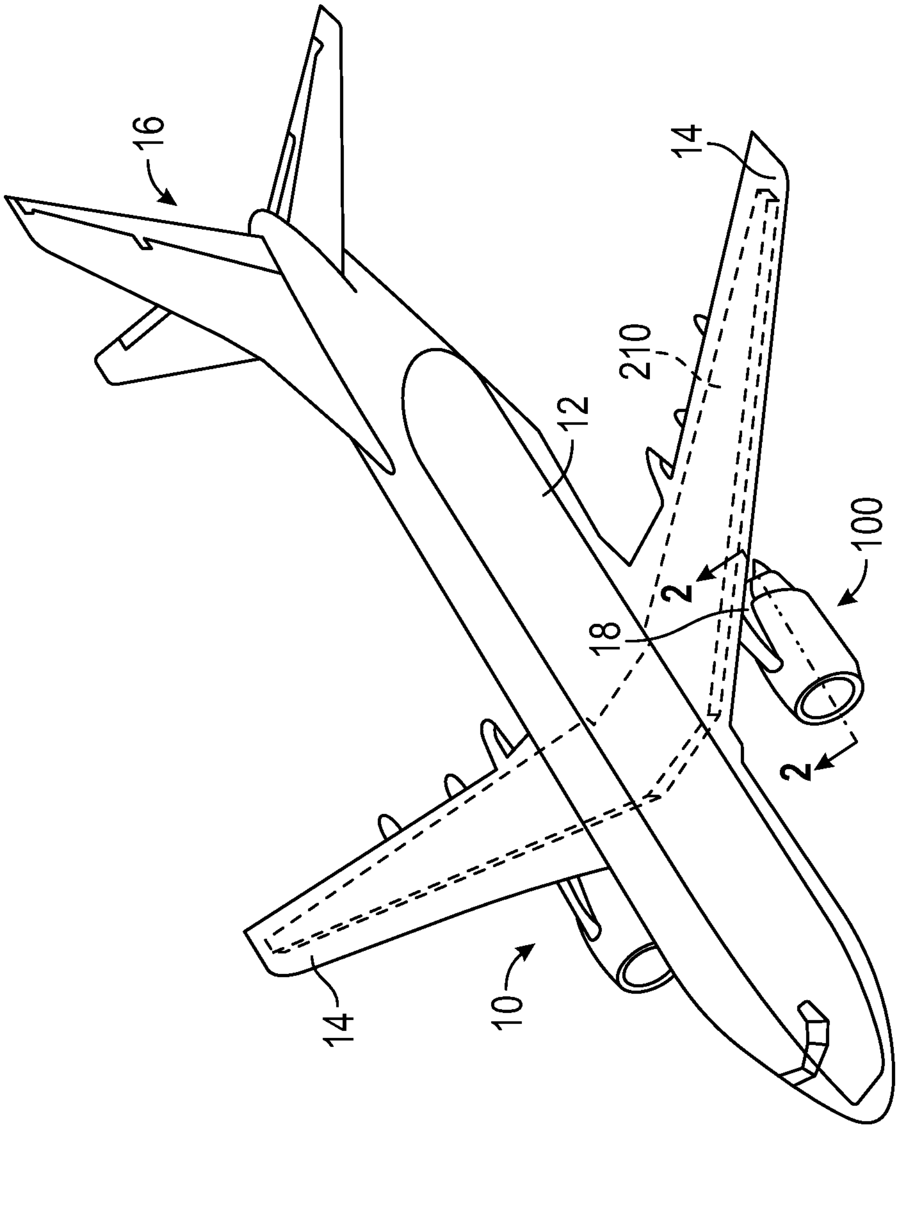
FIG. 1 is a schematic view of an aircraft having a gas turbine engine.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms “first” and “second” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

The term “directly downstream,” when used to describe the relative placement of components in a fluid pathway, refer to components that are placed next to each other in the fluid pathway without any intervening components between them, other than an appropriate fluid coupling, such as a pipe, tube, valve, or the like, to fluidly couple the components. Such components may be spaced apart from each other with intervening components that are not in the fluid pathway.

The terms “coupled,” “fixed,” “attached,” “connected,” and the like refer to both direct coupling, fixing, attaching, or connecting, as well as, indirect coupling, fixing, attaching, or connecting through one or more intermediate components or features, unless otherwise specified herein.

The singular forms “a,” “an,” and “the” include plural references unless the context clearly dictates otherwise.

Here and throughout the specification and claims, range limitations are combined and interchanged. Such ranges are identified and include all the sub-ranges contained therein, unless context or language indicates otherwise. For example, all ranges disclosed herein are inclusive of the endpoints, and the endpoints are independently combinable with each other.

As noted above, coke deposition may occur on surfaces of a gas turbine engine that are exposed to hydrocarbon fluids, such as fuels and lubricating oils that are at elevated temperatures. As the deposits collect, they can become sufficiently large to reduce or even obstruct fluid flow. In the case of a fuel circuit, such carbon deposition can lead to degraded engine performance, reduced heat transfer efficiencies, increased pressure drops, and increased rates of material corrosion and erosion, all of which can necessitate the use of expensive de-coking procedures and even replacement of fuel nozzles. The formation of these carbonaceous deposits is accelerated at elevated temperatures, such as temperatures between four hundred degrees Fahrenheit and eight hundred degrees Fahrenheit. Heating fuel to such temperatures just prior to being injected into a combustion chamber of a gas turbine engine may be beneficial for performance reasons. Coke (carbonaceous deposits) formation is a function of the dissolved oxygen content of the fuel. Reducing the oxygen content of the fuel reduces the formation of these carbonaceous deposits. The oxygen content of the fuel is preferably reduced to concentrations of one part per million or less, and preferably much less than one part per million to avoid the formation of carbonaceous deposits in these hot fuel systems.

Sparging systems may be used to remove oxygen from the fuel. Such systems are most efficient and remove oxygen quickly at oxygen concentrations in the fuel above ten parts per million. To reduce the oxygen concentration to concentrations lower than ten parts per million, the fuel must be exposed to the sparging gas for longer periods of time. These longer periods of time result in larger sizes and thus weight of the sparging system. Using the sparging system alone to reduce the oxygen concentration in fuel to concentrations of one part per million or less, results in a sparging system that is relatively heavy. The fuel system of preferred embodiments discussed herein use an oxygen getter as part of a deoxygenation system to remove oxygen from the fuel. Preferably, the deoxygenation system utilizes both: a first deoxygenation assembly, such as a sparging system that reduces the oxygen concentration in the fuel to a first concentration, and a second deoxygenation assembly, referred to herein as an oxygen gettering assembly, to further reduce the oxygen concentration. In some embodiments, the deoxygenation system further includes a removal assembly that removes oxidation products formed by the oxygen getter.

The fuel system discussed herein is particularly suitable for use in engines, such as a gas turbine engine used on an aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the engines 100 via a fuel system 200 (see FIG. 3). An aviation turbine fuel in the embodiments discussed herein is a combustible hydrocarbon liquid fuel, such as a kerosene-type fuel, having a desired carbon number, a synthetic aviation fuel, a biofuel, a biodiesel, an ethanol, a bioalcohol, and the like. The fuel is stored in a fuel tank 210 of the fuel system 200. As shown in FIG. 1, at least a portion of the fuel tank 210 is located in each wing 14, and a portion of the fuel tank 210 is located in the fuselage 12 between the wings 14. The fuel tank 210, however, may be located at other suitable locations in the fuselage 12 or the wing 14. The fuel tank 210 may also be located entirely within the fuselage 12 or the wing 14. The fuel tank 210 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft, including, for example, helicopters and unmanned aerial vehicles (UAV). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
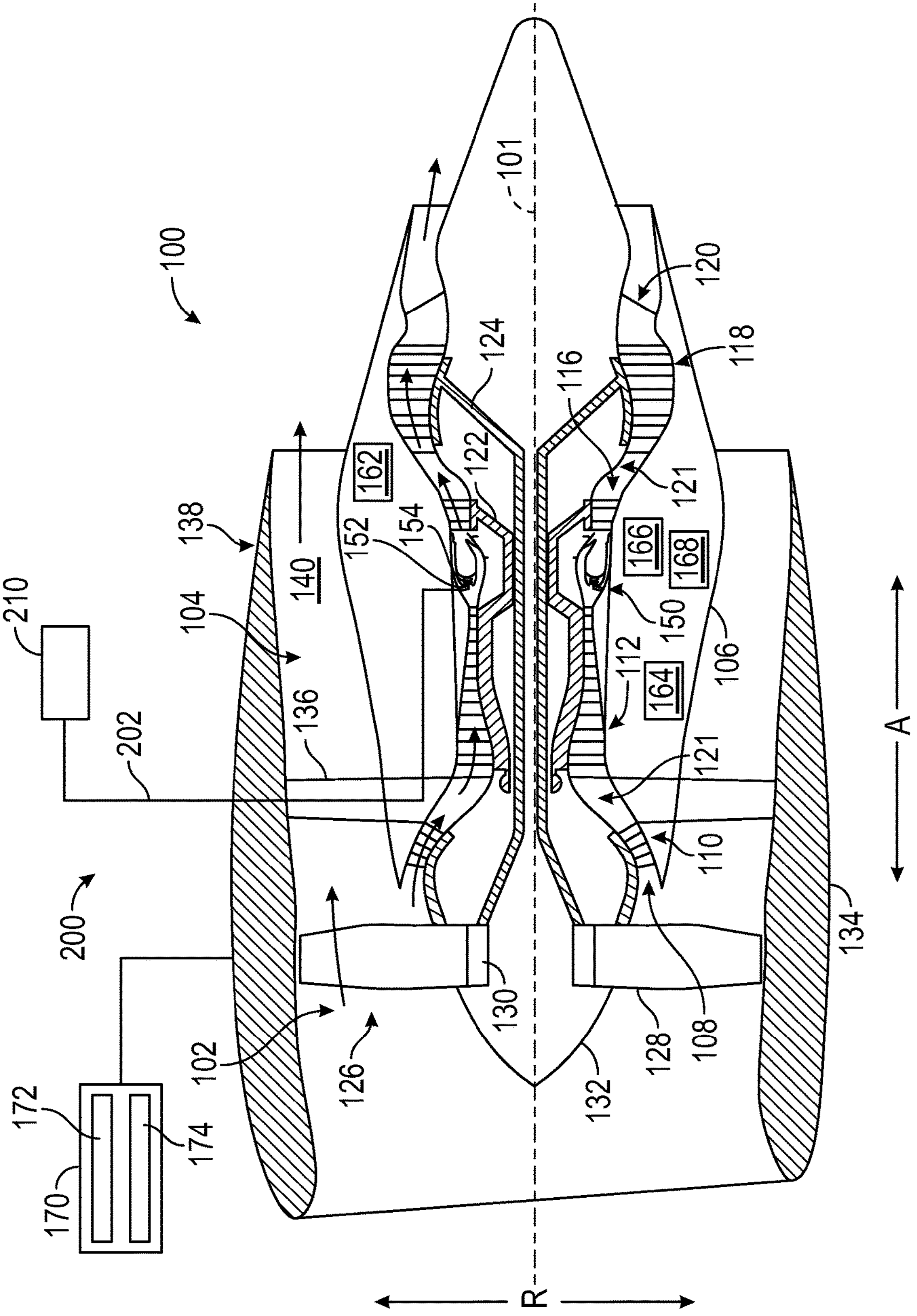
FIG. 2 is a schematic, cross-sectional view, taken along line 2-2 in FIG. 1, of the gas turbine engine of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The engine 100 has an axial direction A (extending parallel to a longitudinal centerline 101, shown for reference in FIG. 2), a radial direction R (extending perpendicular to the longitudinal centerline 101, shown for reference in FIG. 2), and a circumferential direction. The circumferential direction (not depicted in FIG. 2) extends in a direction rotating about the axial direction A. The engine 100 (turbofan engine) includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 150 (also referred to herein as a combustor 150), a turbine section including a high-pressure (HP) turbine 116 and a low-pressure (LP) turbine 118, and a jet exhaust nozzle section 120. The compressor section, the combustion section 150, and the turbine section together define at least in part a core air flowpath 121 extending from the inlet 108 to the jet exhaust nozzle section 120. The turbofan engine further includes one or more drive shafts. More specifically, the turbofan engine includes a high-pressure (HP) shaft or a spool 122 drivingly connecting the HP turbine 116 to the HP compressor 112, and a low-pressure (LP) shaft or a spool 124 drivingly connecting the LP turbine 118 to the LP compressor 110.

The fan section 102 shown in FIG. 2 includes a fan 126 having a plurality of fan blades 128 coupled to a disk 130. The fan blades 128 and the disk 130 are rotatable, together, about the longitudinal centerline (axis) 101 by the LP shaft 124. The LP compressor 110 may also be directly driven by the LP shaft 124, as depicted in FIG. 2. The disk 130 is covered by a rotatable front hub 132 aerodynamically contoured to promote an airflow through the plurality of fan blades 128. Further, an annular fan casing or an outer nacelle 134 is provided circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The engine 100 is operable with the fuel system 200 and receives a flow of fuel from the fuel system 200. As will be described further below, the fuel system 200 includes a fuel delivery assembly 202 providing the fuel flow from the fuel tank 210 to the engine 100, and, more specifically, to a plurality of fuel nozzles 152 that inject fuel into a combustion chamber 154 of the combustor 150.

As discussed above, the compressor section, the combustion section (combustor 150), and the turbine section form, at least in part, the core air flowpath 121 extending from the inlet 108 to the jet exhaust nozzle section 120. Air entering through the inlet 108 is compressed by blades of a plurality of fans of the LP compressor 110 and the HP compressor 112. At least a portion of the compressed air enters (as primary air) the forward end of the combustion chamber 154 of the combustor 150. Fuel is injected by the fuel nozzles 152 into compressed air and mixed with the compressed, primary air. The fuel nozzles 152 of this embodiment are part of a swirler/fuel nozzle assembly. The swirler/fuel nozzle assembly includes a swirler (not shown) that is used to generate turbulence in the primary air. The fuel nozzle 152 injects fuel into the turbulent airflow of the primary air and the turbulence promotes rapid mixing of the fuel with the primary air. The mixture of the fuel and the compressed air is combusted in the combustion chamber 154, generating combustion gases (combustion products), which accelerate as the combustion gases leave the combustion chamber 154. The products of combustion are accelerated as the products are expelled through the outlet of the combustion chamber 154 to drive the engine 100. More specifically, the combusted fuel air mixture is accelerated through the outlet to turn the turbines (e.g., drive the turbine blades) of the HP turbine 116 and the LP turbine 118. As discussed above, the HP turbine 116 and the LP turbine 118, among other things, drive the LP compressor 110 and the HP compressor 112.

The engine 100 also includes various accessory systems to aid in the operation of the engine 100 and/or an aircraft, including the engine 100. For example, the engine 100 may include a main lubrication system 162, a compressor cooling air (CCA) system 164, an active thermal clearance control (ATCC) system 166, and a generator lubrication system 168, each of which is depicted schematically in FIG. 2. The main lubrication system 162 is configured to provide a lubricant to, for example, various bearings and gear meshes in the compressor section, and the turbine section, the HP shaft 122, and the LP shaft 124. The lubricant provided by the main lubrication system 162 may increase the useful life of such components and may remove a certain amount of heat from such components through the use of one or more heat exchangers. The compressor cooling air (CCA) system 164 provides air from one or both of the HP compressor 112 or the LP compressor 110 to one or both of the HP turbine 116 or the LP turbine 118. The active thermal clearance control (ATCC) system 166 acts to minimize a clearance between tips of turbine blades and casing walls as casing temperatures vary during a flight mission. The generator lubrication system 168 provides lubrication to an electronic generator (not shown), as well as cooling/heating removal for the electronic generator. The electronic generator may provide electrical power to, for example, a startup electrical motor for the engine 100 and/or various other electronic components of the engine 100 and/or an aircraft, including the engine 100. The lubrication systems for the engine 100 (e.g., the main lubrication system 162 and the generator lubrication system 168) may use hydrocarbon fluids, such as oil, for lubrication, in which the oil circulates through inner surfaces of oil scavenge lines.

The engine 100 may also include an engine controller 170. The engine controller 170 is configured to operate various aspects of the engine 100, including, in some embodiments, the deoxygenation systems, such as deoxygenation system 300, (see FIG. 4), discussed herein.

The engine controller 170 may be a Full Authority Digital Engine Control (FADEC). In this embodiment, the engine controller 170 is a computing device having one or more processors 172 and one or more memories 174. The processor 172 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 174 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 174 can store information accessible by the processor 172, including computer-readable instructions that can be executed by the processor 172. The instructions can be any set of instructions or a sequence of instructions that, when executed by the processor 172, causes the processor 172 and the engine controller 170 to perform operations. In some embodiments, the instructions can be executed by the processor 172 to cause the processor 172 to complete any of the operations and functions for which the engine controller 170 is configured, as will be described further below. The instructions can be software written in any suitable programming language, or can be implemented in hardware. Additionally, and/or alternatively, the instructions can be executed in logically and/or virtually separate threads on the processor 172. The memory 174 can further store data that can be accessed by the processor 172.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The engine 100 (turbofan engine) discussed herein is, however, provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, it will further be appreciated that, in other embodiments, the gas turbine engine may have other suitable configurations, such as other suitable numbers or arrangements of shafts, compressors, turbines, fans, etc. Further, although the engine 100 is shown as a direct drive, fixed-pitch engine 100, in other embodiments, a gas turbine engine may be a geared gas turbine engine (i.e., including a gearbox between the fan 126 and shaft driving the fan 126, such as the LP shaft 124), may be a variable pitch gas turbine engine (i.e., including a fan 126 having a plurality of fan blades 128 rotatable about their respective pitch axes), etc. Further still, in alternative embodiments, aspects of the present disclosure may be incorporated into, or otherwise utilized with any other type of engine, such as reciprocating engines. Additionally, in still other exemplary embodiments, the exemplary engine 100 may include or be operably connected to any other suitable accessory systems. Additionally, or alternatively, the exemplary engine 100 may not include or be operably connected to one or more of the accessory systems 162, 164, 166, and 168 discussed above.

Figure 3:
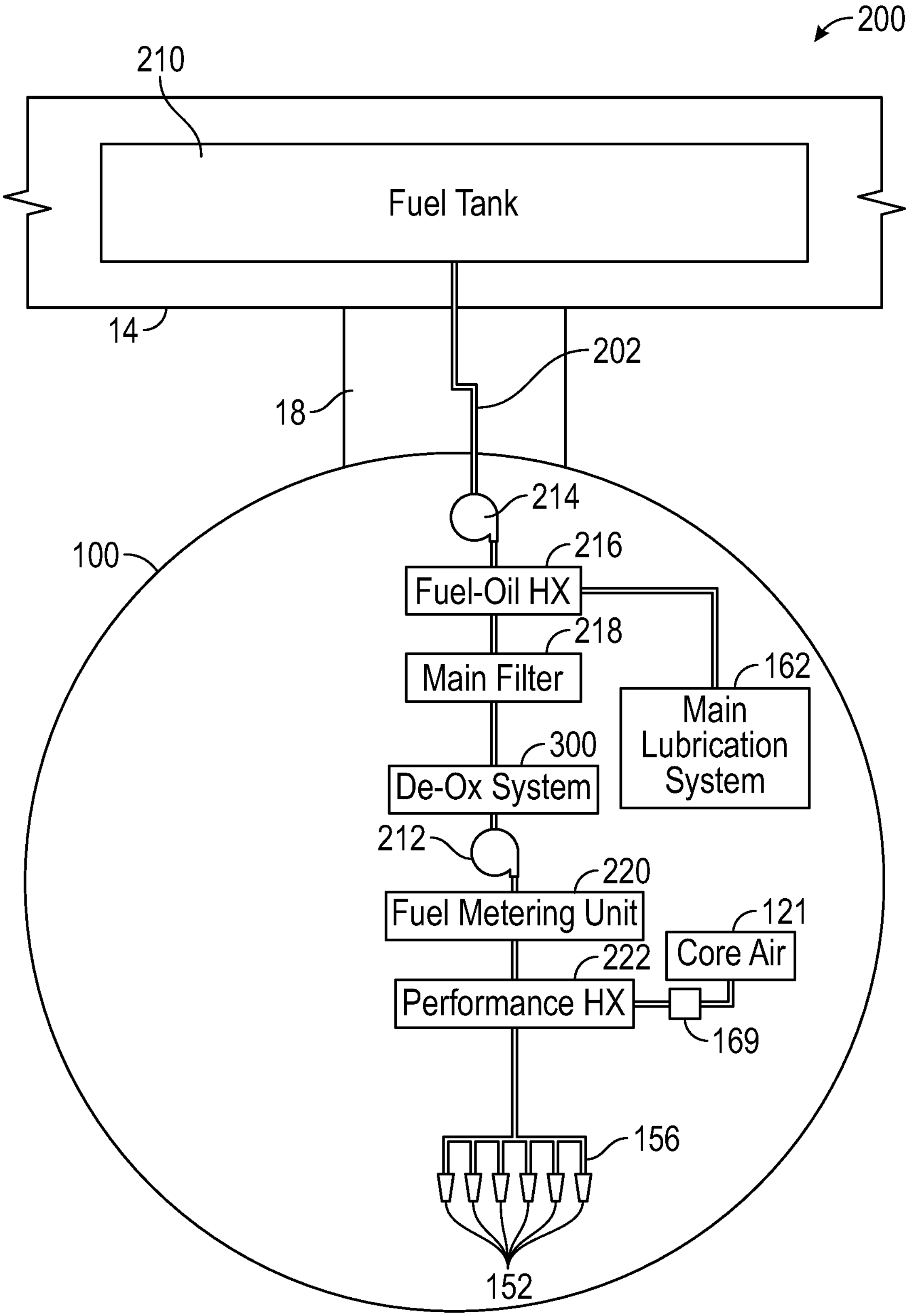
FIG. 3 is a schematic view of a fuel system for the gas turbine engine shown in FIG. 2.

FIG. 3 is a schematic view of the fuel system 200 according to an embodiment of the present disclosure that is configured to store the hydrocarbon fuel for the engine 100 in the fuel tank 210 and to deliver the hydrocarbon fuel to the engine 100 via the fuel delivery assembly 202. In the following discussion, various components are described as being fluidly connected to the fuel delivery assembly 202 or in fluid connection to the fuel delivery assembly 202. These components are also fluidly connected or coupled to each other by, for example, the fuel delivery assembly 202. Various components are also described as being positioned downstream or upstream from other components. A component positioned downstream from another component is configured to receive fuel from the other component, and, likewise, a component positioned upstream of another component is configured to provide fuel to the other component.

The fuel delivery assembly 202 includes tubes, pipes, conduits, and the like, to fluidly connect the various components of the fuel system 200 to the engine 100. As noted above, the fuel tank 210 is configured to store the hydrocarbon fuel, and the hydrocarbon fuel is supplied from the fuel tank 210 to the fuel delivery assembly 202. The fuel delivery assembly 202 is configured to carry the hydrocarbon fuel between the fuel tank 210 and the engine 100, and, thus, provides a flow path (fluid pathway) of the hydrocarbon fuel from the fuel tank 210 to the engine 100. As noted above, the terms “downstream” and “upstream,” as used herein, may be used to describe the position of components relative to the direction of flow of the hydrocarbon fuel in the flow path of the fuel delivery assembly 202. The fuel delivery assembly 202 may also include various valves and other components to deliver the hydrocarbon fuel to the engine 100 that are not shown in FIG. 3.

The fuel system 200 includes at least one fuel pump, and, in the embodiment shown in FIG. 3, a plurality of fuel pumps, fluidly connected to the fuel delivery assembly 202 to induce the flow of the fuel through the fuel delivery assembly 202 to the engine 100. One such pump is a main fuel pump 212. The main fuel pump 212 is a high-pressure pump that is the primary source of pressure rise in the fuel delivery assembly 202 between the fuel tank 210 and the engine 100. The main fuel pump 212 may be configured to increase a pressure in the fuel delivery assembly 202 to a pressure greater than a pressure within the combustion chamber 154 of the combustor 150 (FIG. 2).

The fuel system 200 may also include other supplementary pumps, such as an inlet pump 214. In this aspect, the inlet pump 214 is a low-pressure pump that is configured to provide an initial pressurization to induce a flow of the hydrocarbon fuel through the fuel delivery assembly 202. The inlet pump 214 may be configured to provide less of a pressure rise within the fuel delivery assembly 202 than does the main fuel pump 212. The inlet pump 214 may be configured to provide less than 80% of the pressure rise of the main fuel pump 212, such as less than 70%, such as less than 60%, such as less than 50%, such as less than 40%, such as less than 30%, such as less than 20%, such as at least 5% of the pressure rise of the main fuel pump 212.

In the embodiment shown in FIG. 3, the inlet pump 214 is downstream of the fuel tank 210 and upstream of the main fuel pump 212. Although the inlet pump 214 is shown as being located within the engine 100, the inlet pump 214 may also be suitably located in other portions of the aircraft 10, such as the fuselage 12, the wing 14, or the pylon 18 (FIG. 1). The inlet pump 214 induces the flow of fuel from the fuel tank 210, and then the fuel is heated by a preheater 216.

The preheater 216 is in fluid communication with the fuel delivery assembly 202 and may be any suitable heater, such as an electrical resistance heater, a catalytic heater, or a burner. In some embodiments, such as the one depicted in FIG. 3, the preheater 216 may be a heat exchanger that is in thermal communication with any suitable heat source, such as any suitable engine and/or aircraft heat source. Such an engine heat source may include, for example, the main lubrication system 162, and the preheater 216 may be a fuel-oil heat exchanger (HX) fluidly connected to the main lubrication system 162 and configured to extract heat from the oil of the main lubrication system 162 and to heat the hydrocarbon fuel flowing through the preheater 216. The preheater 216 is preferably configured to heat the fuel to temperatures that avoid the formation of ice in the fuel and to cool the oil of the main lubrication system 162. The preheater 216 may be configured to heat the fuel, as measured at the outlet of the preheater 216, to temperatures preferably from zero degrees Fahrenheit to two-hundred degrees Fahrenheit. Although, the preheater 216 is shown as being located within the engine 100, the preheater 216 may also be suitably located in other portions of the aircraft 10 such as the fuselage 12, the wing 14, or the pylon 18 (FIG. 1).

The fuel system 200 also includes a main filter 218 in fluid communication with the fuel delivery assembly 202. The main filter 218 is configured to remove contaminates that may be present in the fuel supply and is, thus, preferably positioned close to the fuel tank 210 and upstream of many of the major components of the fuel system 200, such as, for example, the main fuel pump 212, a fuel metering unit 220, and a deoxygenation system 300. In the embodiment depicted in FIG. 3, the main filter 218 is positioned downstream of the fuel tank 210, the inlet pump 214, and the preheater 216. Although the main filter 218 is shown as being located within the engine 100, the main filter 218 may also be suitably located in other portions of the aircraft 10 such as the fuselage 12, the wing 14, or the pylon 18 (FIG. 1). The main filter 218 may be any suitable filter including, for example, a mesh filter. The main filter 218 preferably may have a nominal micron rating from ten microns to fifty microns to remove potential contaminants.

The fuel system 200 also includes the fuel metering unit 220 in fluid communication with the fuel delivery assembly 202. Any suitable fuel metering unit 220 may be used including, for example, a metering valve. The fuel metering unit 220 is positioned downstream of the main fuel pump 212 and upstream of a fuel manifold 156 configured to distribute fuel to the fuel nozzles 152. The fuel system 200 is configured to provide fuel to the fuel metering unit 220, and the fuel metering unit 220 is configured to receive fuel from the fuel tank 210. The fuel metering unit 220 is further configured to provide the flow of fuel to the engine 100 in a desired manner. More specifically, the fuel metering unit 220 is configured to meter the fuel and to provide a desired volume of fuel at, for example, a desired flow rate to the fuel manifold 156 of the engine 100. The fuel manifold 156 is fluidly connected to the fuel nozzles 152 and distributes (provides) the fuel received to the plurality of fuel nozzles 152, when, as discussed above, the fuel is injected into the combustion chamber 154 and combusted. Adjusting the fuel metering unit 220 changes the volume of fuel provided to the combustion chamber 154 and, thus, changes the amount of propulsive thrust produced by the engine 100 to propel the aircraft 10.

Fuel downstream of the fuel metering unit 220 may be heated further to improve gas turbine efficiency, performance, and durability. Fuel may be used as a cooling source to improve durability of the aircraft or the engine components or used to extract heat from core air flowpath 121 or the CCA system 164 (FIG. 2) to improve engine thermodynamic efficiency. The fuel system 200 of this embodiment further includes a heat exchanger, which may be referred to as a performance heat exchanger (HX) 222 herein. The performance heat exchanger 222 may be configured to heat the fuel to temperatures greater than three hundred fifty degrees Fahrenheit, more preferably, from four hundred degrees Fahrenheit to nine hundred degrees Fahrenheit. The performance heat exchanger 222 is positioned upstream of the fuel nozzles 152 and, more specifically, upstream of the fuel manifold 156. With the high temperature fuel produced using the performance heat exchanger 222, the performance heat exchanger 222 is preferably located close to the fuel manifold 156, minimizing the number of intervening components in the fuel system 200 between the performance heat exchanger 222 and the fuel nozzles 152. The performance heat exchanger 222 is located downstream of the fuel metering unit 220 and, more specifically, directly downstream of the fuel metering unit 220.

The performance heat exchanger 222 may be a heat exchanger that is in thermal communication with any suitable heat source, such as any suitable engine and/or aircraft heat source. The performance heat exchanger 222 may be in thermal communication with a hot gas path of an engine 100. Such an engine heat source may include, for example, a flow path of heated air through the engine 100, such as the core air flowpath 121. The performance heat exchanger 222 also may be fluidly connected to, for example, the CCA system 164 (FIG. 2) to cool the HP turbine 116 (FIG. 2). The performance heat exchanger 222 may be thermally connected to other portions of the core air flowpath 121 (FIG. 2), including the jet exhaust nozzle section 120 (FIG. 2). Additionally, or alternatively, in other embodiments, the performance heat exchanger 222 may be thermally coupled to an intermediate thermal transfer system 169, which is, in turn, thermally coupled to one or more systems of the engine 100, or a flowpath for air through the engine 100. The performance heat exchanger 222 may be thermally coupled to the intermediate thermal transfer system 169 to receive heat from these heat sources.

The fuel system 200 also may include the deoxygenation system 300 that is configured to reduce the amount of oxygen in the fuel. Oxygen in the fuel may be a contributor to thermal oxidation of the fuel and the generation of coke, particularly, at temperatures greater than three hundred degrees Fahrenheit. In this embodiment, the deoxygenation system 300 is in fluid communication with the fuel delivery assembly 202 at a position upstream of the performance heat exchanger 222 such that the deoxygenation system 300 reduces the oxygen content of the fuel supplied to the performance heat exchanger 222. As shown in FIG. 3, the deoxygenation system 300 also is upstream of the fuel metering unit 220 and the main fuel pump 212. The deoxygenation system 300 is downstream of the main filter 218 and, more specifically, directly downstream of the main filter 218. Preferably, the deoxygenation system 300 reduces the oxygen content in the fuel such that fuel provided by the deoxygenation system 300 may have an oxygen content of less than five parts per million ("ppm"), such as less than three ppm, such as less than two ppm, such as less than one ppm, such as less than a half ppm, such as less than one tenth ppm.

Figure 4:
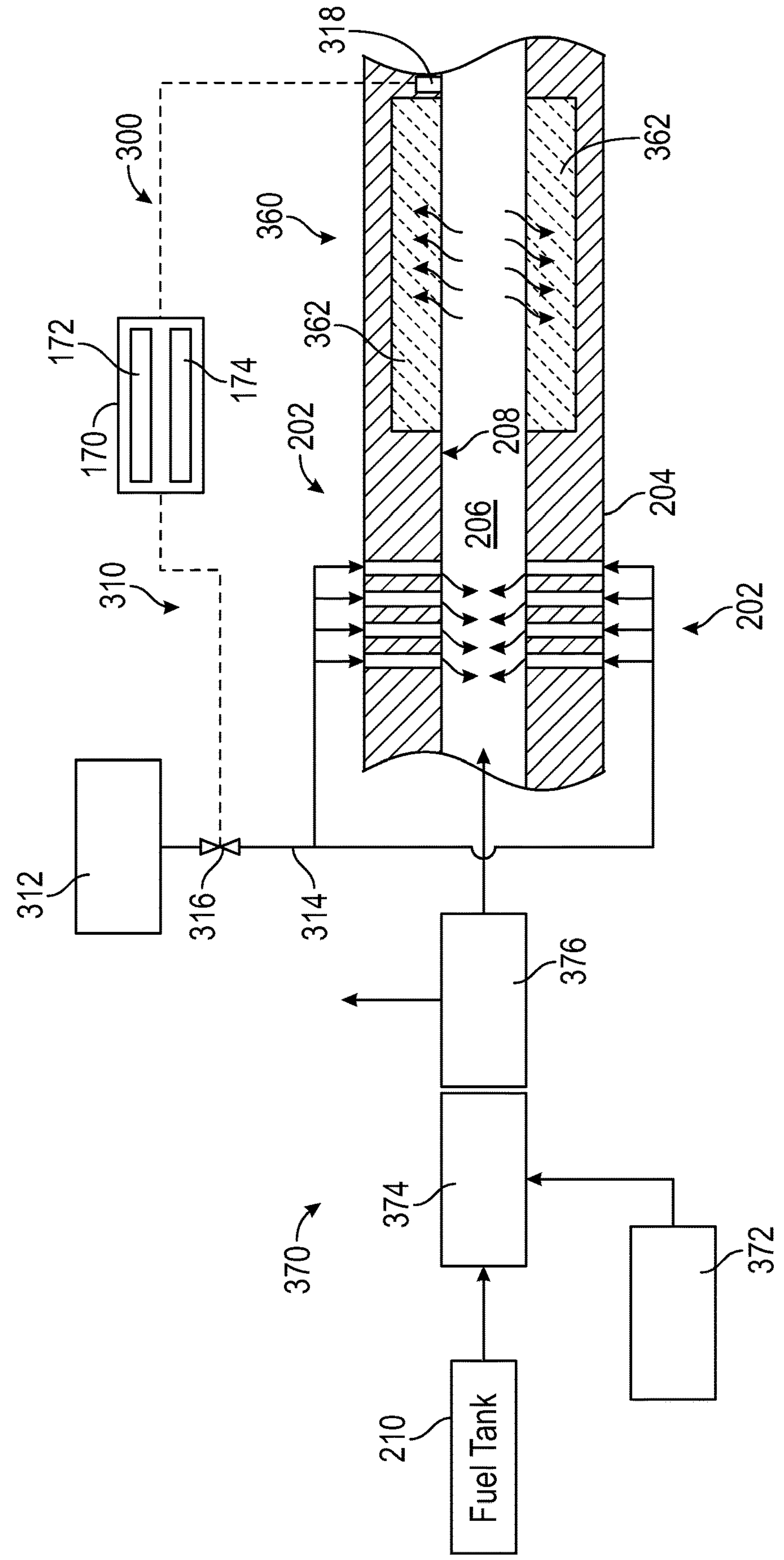
FIG. 4 is a schematic and partial cross-sectional view of a deoxygenation system according to an embodiment of the present disclosure that may be used in the fuel system shown in FIG. 3.

FIG. 4 is a schematic partial cross-sectional view of the deoxygenation system 300 that may be used in the fuel system 200 of FIG. 3. The deoxygenation system 300 includes an oxygen gettering assembly 310 to chemically remove oxygen from the fuel. The oxygen gettering assembly 310 introduces an oxygen scavenger or oxygen getter into the fuel to remove oxygen from the fuel. The term oxygen getter will be used herein and refers to an element or compound that chemically removes oxygen from the fuel (hydrocarbon fluid). Such an oxygen getter preferably has a high affinity for oxygen, such that, when the oxygen getter is introduced into the fuel, the oxygen getter binds very well with oxygen forming an oxidation product and removing oxygen from the fuel. In general, the greater the affinity and the binding capacity of the oxygen getter, the more the oxygen level in the fuel can be reduced. The oxygen getter may preferably remove not only dissolved oxygen, but also oxygen that is part of other compounds (chemically bound) within the fuel.

Various suitable oxygen getters may be used, including both organic compounds and inorganic elements and compounds. Suitable organic compounds include, for example, diphenylphosphine; triphenylphosphine; trimethylpyrrole; N,N-dimethylaniline; para-substituted N,N-dimethylanilines, where the substitution is made with a methyl group, a methoxy group, or a cyano group; para-substituted thioanisole, where the substitution is made with methyl group or a methoxy group; or β-carophyllene. Suitable inorganic oxygen getters include metals such as aluminum, barium, magnesium, titanium, zirconium, tantalum, yttrium, terbium, and other rare-earth elements. In addition, alloys of such metals may be used including, for example, barium-magnesium alloys. Other suitable inorganic oxygen getters include, for example, carbides, such as calcium carbide and aluminum carbide. Preferably, the oxygen getter does not spontaneously oxidize without a trigger. Oxygen getters that are susceptible to spontaneous oxidation pose a fire hazard or a safety hazard. In the embodiments discussed herein, the oxygen getter, thus preferably, forms the oxidation products when the fuel temperature is at a temperature of one hundred seventy degrees Fahrenheit or greater. As noted above, coke formation typically begins to form at temperature of three hundred degrees Fahrenheit or greater, and thus the oxygen getter forms oxidation products at a temperature of three hundred degrees Fahrenheit or less. As discussed further below, these temperatures are referred to herein as an activation temperature for the oxygen getter.

The oxygen getter may be introduced into the fuel using any suitable means. The oxygen getter may be a liquid, such as when the oxygen getter is one of the organic oxygen getters discussed above, and the oxygen getter may be stored in a suitable liquid storage chamber, such as an oxygen getter storage tank 312. As noted above, the fuel delivery assembly 202 may include a fuel conduit 204 having a fuel passage 206 through which the fuel flows. The oxygen getter storage tank 312 is fluidly coupled to the fuel passage 206 using, for example, an oxygen getter conduit 314. The oxygen getter is then added directly to the fuel in the fuel passage 206 as an additive in a suitable concentration. Any suitable injection system may be used to inject the inject the oxygen getter into the fuel passage 206, including, for example, the fuel additive injection system shown and described in U.S. Pat. No. 10,844,788, the disclosure of which is incorporated by reference herein in its entirety. The oxygen getter storage tank 312 may be refilled or replaced to replenish the supply of the oxygen getter as needed.

The oxygen gettering assembly 310 may be configured to inject the oxygen getter into the fuel passage 206 at a set (or predetermined) release rate. In other embodiments, however, the release rate may be actively controlled by a suitable controller, such as the engine controller 170. The engine controller 170 may be communicatively and operatively coupled to the oxygen gettering assembly 310 to control the flow of the oxygen getter through the oxygen getter conduit 314. More specifically, the engine controller 170 may be operatively coupled to a flow control valve 316 to control the position (amount open or closed) of the flow control valve 316 and thus the release rate of the oxygen getter into the fuel in the fuel passage 206.

The engine controller 170 may use various suitable inputs to control the amount of oxygen in the fuel and, more specifically, the release rate of the oxygen getter. The deoxygenation system 300 may include, for example, an oxygen sensor 318 configured to measure the oxygen concentration in the fuel within the fuel passage 206. Any suitable oxygen sensor 318 that is able to measure the concentrations of oxygen in the fuel discussed herein may be used including, for example, the RE-HI-8 RedEye sensor by Ocean Insight of Orlando, Florida, USA. The engine controller 170 is communicatively coupled to the oxygen sensor 318 to receive oxygen concentration information from the oxygen sensor 318. The engine controller 170 is configured to adjust the release rate of the oxygen getter based on the oxygen concentration information received from the oxygen sensor 318. More specifically, when the oxygen concentration is greater than a first threshold oxygen concentration amount, the controller 170 may increase the release rate of the oxygen getter, such as by adjusting the position of the flow control valve 316 (further opening the flow control valve 316). When the oxygen concentration is less than a second threshold oxygen concentration amount, the controller 170 may decrease the release rate of the oxygen getter, such as by adjusting the position the flow control valve 316 (reducing the opening amount of the flow control valve 316). The oxygen sensor 318 is positioned downstream of the oxygen gettering assembly 310 and, more specifically, in this embodiment, downstream of an oxidation product removal assembly 360.

The oxygen gettering assembly 310 may have various different configurations. FIGS. 5A to 5E show other suitable configurations for the oxygen gettering assembly. In addition, the oxygen gettering assemblies shown in FIGS. 4 and 5A to 5E also include similar features/components and the same reference numerals will be used for features/components that are the same or similar to those in other configurations of the oxygen gettering assembly. The description of these features and components in one configuration also applies to the other configurations.

Figure 5A:
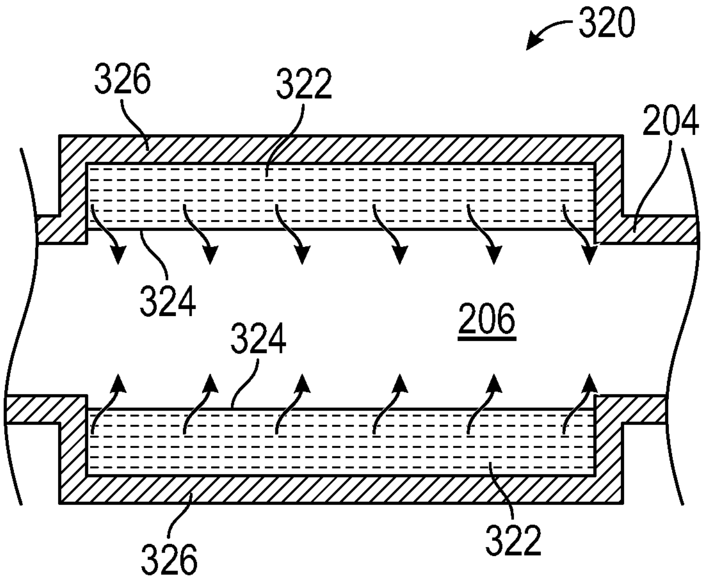
FIGS. 5A to 5E show alternative partial configurations of an oxygen gettering assembly that may be used in the deoxygenation systems discussed herein.

FIG. 5A is a schematic, cross-sectional view of another oxygen gettering assembly 320 that may be used in the deoxygenation systems discussed herein, such as the deoxygenation system 300 shown in FIG. 4. The oxygen gettering assembly 320 of this embodiment is also suitable for introducing the oxygen getter into the fuel when the oxygen getter is a liquid. In this embodiment, the oxygen getter is stored in an oxygen getter storage chamber 322. A membrane 324 is formed in an opening of the fuel conduit 204 and separates the oxygen getter storage chamber 322 and the oxygen getter from the fuel passage 206 and the fuel. The membrane 324 is permeable to the oxygen getter and allows for a controlled release (introduction) of the oxygen getter into the fuel in the fuel passage 206. The positioning of the oxygen getter and the oxygen getter cartridge 326 shown in FIG. 5A is referred to herein as an around configuration where the oxygen getter is positioned around the fuel passage 206. This around configuration may include oxygen getter (including the oxygen getter storage chamber 322 and membrane 324) that surrounds the fuel passage 206 or a plurality of oxygen getter storage chambers 322 and corresponding membranes 324 positioned to surround the fuel passage 206. Alternatively, the plurality of oxygen getter storage chambers 322 may be spaced apart at discrete distances from each other around the fuel passage 206.

Figure 5B:
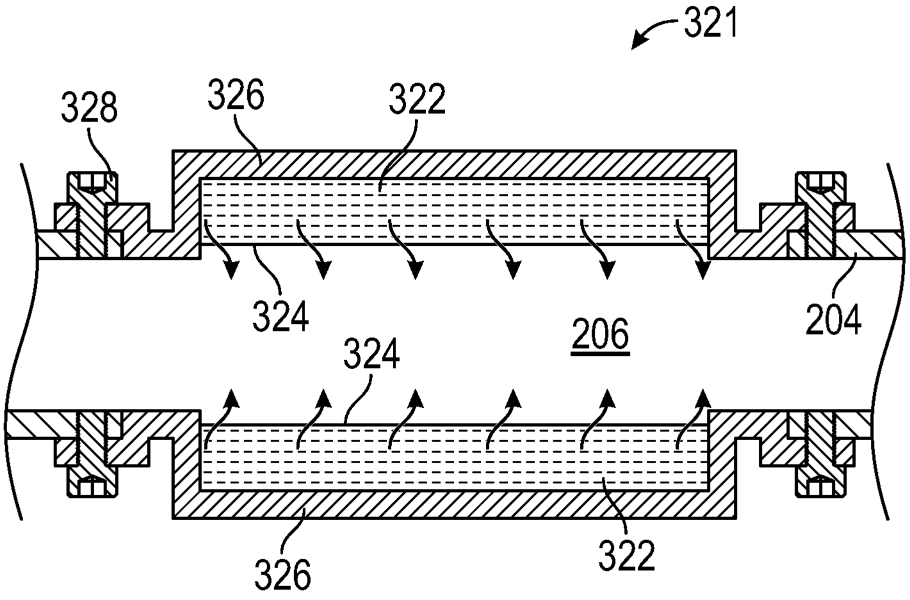

FIG. 5B is a schematic, cross-sectional view of another oxygen gettering assembly 321 that may be used in the deoxygenation systems discussed herein, such as the deoxygenation system 300 shown in FIG. 4. The configuration of the oxygen gettering assembly 321 shown in FIG. 5B is similar to the oxygen gettering assembly 320 discussed above with reference to FIG. 5A. The same reference numerals will be used for components of this configuration of the oxygen gettering assembly 321 that are the same as or similar to the components of the oxygen gettering assembly 320 discussed above. The description of these components above also applies to this configuration, and a detailed description of these components is omitted here.

The oxygen getter may be integrally formed with the conduit 204, with the membrane 324 coupled to the fuel conduit 204 and the fluid conduit 204 shaped to form the oxygen getter storage chamber 322, as shown in FIG. 5A, for example. Alternatively or additionally, the oxygen getter may be located in an oxygen getter cartridge 326 that is detachably connected to the fuel conduit 204. More specifically, in the configuration shown in FIG. 5B, the oxygen getter storage chamber 322 and membrane 324 may be formed as the oxygen getter cartridge 326. The oxygen getter cartridge 326 can be replaced periodically to replenish the supply of the oxygen getter. The oxygen getter cartridge 326 may be detachably connected to the fuel conduit by various suitable means including, for example, a fastener such as a bolt 328. The oxygen getter in this configuration is positioned as an around configuration. This around configuration may include a single oxygen getter cartridge 326 that surrounds the fuel passage 206 or a plurality of oxygen getter cartridges 326 positioned to surround the fuel passage 206. Alternatively, the plurality of oxygen getter cartridges 326 may be spaced apart at discrete distances from each other around the fuel passage 206.

Figure 5C:
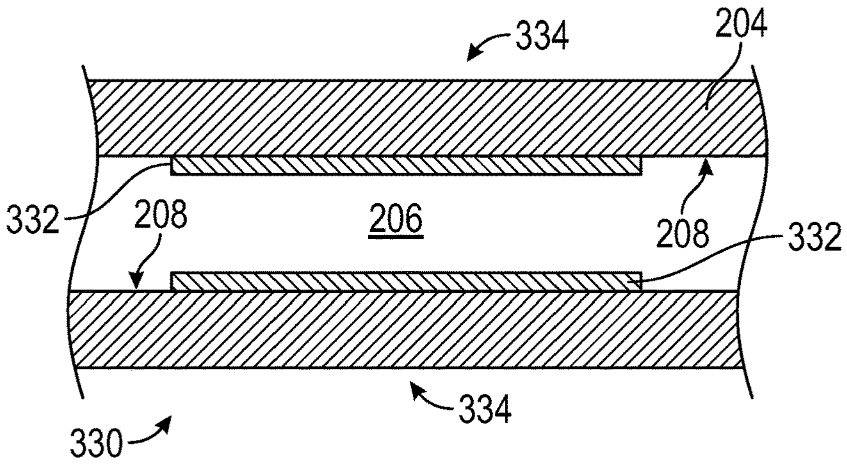

FIG. 5C is a schematic, cross-sectional view of another oxygen gettering assembly 330 that may be used in the deoxygenation systems discussed herein, such as the deoxygenation system 300 shown in FIG. 4. Some of the oxygen getters that may be suitable for use in the deoxygenation system 300 may be in a solid form when the fuel comes into contact with the oxygen getter. For example, many of the inorganic oxygen getters discussed above are solids at the temperatures of the fuel. These oxygen getters, such as the metals discussed above, may be applied to an inner surface 208 of the fuel conduit 204 to form a layer of the oxygen getter (oxygen getter layer 332). The inner surface 208 faces the fuel passage 206 and may at least in part, define the fuel passage 206. The oxygen getter layer 332 may be formed by applying the oxygen getter to the inner surface 208 of the fuel conduit 204 using a suitable method for the oxygen getter, such as electroplating, chemical vapor deposition, and the like. In some embodiments, the oxygen getter layer 332 is formed over a section 334 of the fuel conduit 204. This section may be removable/replaceable to replenish the oxygen getter as needed, similar to the oxygen getter cartridge 326 discussed above. This embodiment is another example of an around configuration where the oxygen getter is positioned around the fuel passage 206.

Figure 5D:
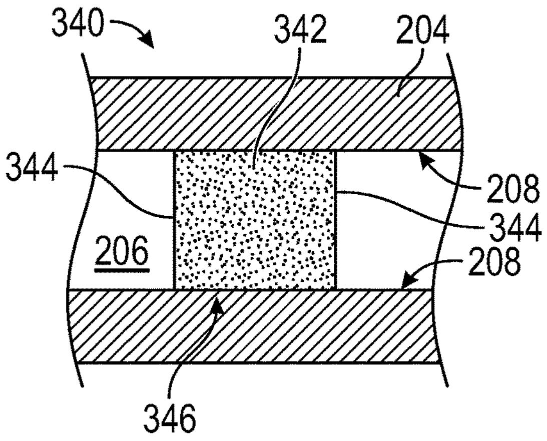

FIG. 5D is a schematic, cross-sectional view of another oxygen gettering assembly 340 that may be used in the deoxygenation systems discussed herein, such as the deoxygenation system 300 shown in FIG. 4. Another solid form of a suitable oxygen getter is a particulate. The oxygen gettering assembly 340 of this embodiment includes a storage chamber 342 for storing the oxygen getter as a powder. The storage chamber 342 is formed within a housing 344 and collectively forms an oxygen getter cartridge 346. The oxygen getter cartridge 346 may be placed within the fuel passage 206 of the fuel conduit 204. The housing 344 is permeable, allowing fuel to flow through the oxygen getter in the storage chamber 342 as the fuel flows through the fuel passage 206. Suitable permeable portions of the housing 344 include, for example, mesh that is sized to retain the particulate (oxygen getter) but allow fuel to flow through the mesh. As with the oxygen gettering assembly 320 discussed above, the oxygen getter cartridge 346 may be replaced to replenish the oxygen getter as needed.

This embodiment is an example of an in-line configuration of the oxygen getter. In an in-line configuration, the oxygen getter is positioned within the flow of fuel (within the fuel passage 206) to have fuel flow through the oxygen getter. Although the oxygen getter cartridge 346 is shown as being positioned within the entire width (diameter) of the fuel passage 206, the oxygen getter cartridge 346 may be positioned to contact only a portion of the fuel flowing through the fuel passage 206. In addition, although the oxygen getter cartridge 346 is shown in an in-line configuration, the oxygen getter cartridge 346 may alternatively be positioned in an around configuration, such as the configuration of the oxygen getter cartridge 326 shown in FIG. 5A. In an around configuration, the oxygen getter may be positioned along the periphery (the inner surface 208, in this embodiment) of the fuel passage 206.

Figure 5E:
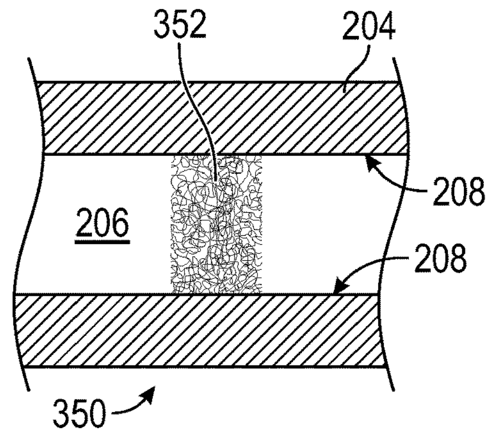

FIG. 5E is a schematic, cross-sectional view of another oxygen gettering assembly 350 that may be used in the deoxygenation systems discussed herein, such as the deoxygenation system 300 shown in FIG. 4. Another solid form of a suitable oxygen getter is fibers. The oxygen gettering assembly 350 includes fibers of the oxygen getter. These fibers can be intertwined with each other to form a porous mass, such as a sponge formed of intertwined fibers (an oxygen getter sponge 352). Alternatively, the oxygen getter sponge 352 may be formed using high surface area metal foams of the oxygen getter. Similar to the oxygen getter cartridge 346 discussed above, the oxygen getter sponge 352 may be placed in the fuel passage 206 of the fuel conduit 204 with the fuel flowing through the oxygen getter sponge 352. The oxygen getter sponge 352 may be replaced to replenish the oxygen getter as needed.

Although the oxygen getter sponge 352 is shown in FIG. 5E as being positioned within the entire width (diameter) of the fuel passage 206, the oxygen getter sponge 352 may be positioned to contact only a portion of the fuel flowing through the fuel passage 206. In addition, although the oxygen getter sponge 352 is shown in an in-line configuration, the oxygen getter sponge 352 may alternatively be positioned in an around configuration, such as by being positioned along the inner surface 208 of the fuel conduit 204, for example.

The oxygen getter produces oxidation products as the oxygen getter reacts with the oxygen in the fuel. Such oxidation products may form on the oxygen getter and be retained by the oxygen gettering assembly 330, 340, and 350, particularly, in the embodiments discussed above when the oxygen getter is in a solid form. As discussed above, the oxygen gettering assemblies 330, 340, and 350 may utilize a modular cartridge that can be removed to replenish the oxygen getter. Alternatively, however, other means may be used to replenish the oxygen getter. For example, the oxygen getter may be periodically regenerated. A method of regenerating the oxygen getter includes flowing a regenerating fluid through the fuel passage 206 and exposing the oxygen getter to the regenerating fluid. The regenerating fluid may be any suitable fluid that regenerates the oxygen getter by removing oxygen from the oxygen getter. For example, the regenerating fluid may be a fluid, such as hydrogen ($H_2$) gas, that creates a reducing environment when the oxygen getter is exposed to the regenerating fluid. For example, when the oxygen getter is a metallic oxygen getter, the oxygen getter may be regenerated by flowing hydrogen ($H_2$) gas, preferably, at an elevated temperature, past or through the oxygen getter to remove the oxygen from the metallic oxygen getter and thereby to regenerate the oxygen getter.

The oxidation products may also be suspended within the fuel. Provided the suspended oxidation products do not precipitate out or otherwise form deposits within the fuel system 200, the oxidation products may remain in the fuel through combustion. In other embodiments, particularly, when the oxidation products may precipitate out of the fuel, the oxidation products may be removed.

The deoxygenation system 300 shown in FIG. 4 may also include an oxidation product removal assembly 360. The oxidation product removal assembly 360 is positioned downstream of the oxygen gettering assembly 310 and, more specifically, in this embodiment, directly downstream of the oxygen gettering assembly 310. The oxidation product removal assembly 360 includes an oxidation product remover that, in the embodiment shown in FIG. 4, is applied to the inner surface 208 of the fuel conduit 204 to form a layer of the oxidation product remover (oxidation product remover layer 362). The oxidation product remover may be any suitable material that can remove the oxidation products. Such materials include, for example, porous materials with a pore size tuned to the size of the oxidation product (molecule), such as molecular sieves, zeolites, or metal organic frameworks. Other suitable materials include those with selective physisorption or chemisorption tendency for the oxidation product. Accordingly, in the embodiment shown in FIG. 4, the oxidation product remover layer 362 is a porous, high surface area coating, similar to the oxygen getter layer 332 discussed above, and the discussion of the oxygen gettering assembly 330 also applies to the oxidation product removal assembly 360 of this embodiment.

The oxidation product remover may have various suitable forms, such as a high surface area powder. In such a case, the oxidation product removal assembly 360 may have a configuration similar to the oxygen gettering assembly 340 discussed above with reference to FIG. 5D with the oxidization product remover being placed in the storage chamber 342 instead of the oxygen getter. Accordingly, the discussion of the oxygen gettering assembly 340 above also applies to the oxidation product removal assembly 360. The oxidation product remover may also be a fiber, and, thus, the oxidation product removal assembly 360 may also have a configuration similar to the oxygen gettering assembly 350 discussed above with reference to FIG. 5E, with the oxidation product remover being in the form of a porous sponge such as the oxygen getter sponge 352. Accordingly, the discussion of the oxygen gettering assembly 350 above also applies to the oxidation product removal assembly 360. In another embodiment, the oxidation product remover may be a filter. The oxidation product remover may have either an around configuration or an in-line configuration. The oxidation product removal assembly 360 may thus include the oxidation product remover in a replaceable or removable form, such as by the cartridges discussed above.

Although an oxygen getter (as part of the oxygen gettering assembly 310, for example) may be used alone to remove oxygen from the fuel, in preferred embodiments, the oxygen getter is used in conjunction with another system to remove oxygen from the fuel. The deoxygenation system 300 of this embodiment includes a plurality of oxygen removal assemblies, such a first oxygen removal assembly and a second oxygen removal assembly. In the embodiment shown in FIG. 4, the first oxygen removal assembly is a sparging system 370, and the oxygen getter is part of the second oxygen removal assembly. Accordingly, the deoxygenation system 300 of this embodiment includes the sparging system 370.

The sparging system 370 includes a sparging gas source 372 fluidly connected to a contactor 374. The contactor 374 is located within the fuel delivery assembly 202 and also receives fuel into the contactor 374. The sparging gas is introduced into the contactor 374 to be mixed with the fuel in the contactor 374. The contactor 374 may be configured in any suitable manner to substantially mix the sparging gas with the fuel. For example, the contactor 374 may in certain embodiments, be a mechanically driven contactor (e.g., having paddles for mixing the sparging gas and the fuel), or alternatively may be a passive contactor for mixing the sparging gas and the fuel using, at least in part, a pressure and/or a flowrate of the sparging gas and the fuel. For example, a passive contactor may include one or more turbulators, venturis, and the like, to promote turbulence and mixing in the fuel and the sparging gas flows.

The sparging gas is bubbled through the fuel in the contactor 374. As the sparging gas is bubbled through the fuel, the sparging gas absorbs the oxygen from the fuel, and thus, reduces the oxygen content of the fuel. Any suitable sparging gas may be used including, inert gases, such as nitrogen ($N_2$), argon (Ar), or carbon dioxide ($CO_2$).

The sparging system 370 also includes a separator 376 positioned downstream of the contactor 374. The separator 376 receives the fuel mixed with the sparging gas, and the separator 376 separates the sparging gas from the fuel. Removing the sparging gas, which has absorbed oxygen from the fuel, from the fuel thus removes oxygen from the fuel and reduces the oxygen concentration of the fuel. The sparging gas may be vented to the atmosphere downstream, relative to the flow of the sparging gas, of the separator 376. In other embodiments, instead of being vented to the atmosphere, the sparging gas may be recycled after removal (or reduction) of oxygen in a separate chamber.

The sparging system 370 of this embodiment is positioned upstream of the oxygen gettering assembly 310. The sparging system 370 may thus be used to reduce the oxygen concentration of the fuel to a first concentration, such as, preferably, twenty ppm or less, ten ppm or less, five ppm or less, or even three ppm or less. The fuel with reduced oxygen concentration then flows to the oxygen gettering assembly 310 where the oxygen getter (oxygen gettering assembly 310) is used to further reduce the oxygen concentration to a second concentration, such as, less than five ppm, such as less than three ppm, such as less than two ppm, such as less than one ppm, such as less than a one-half ppm, such as less than one tenth ppm.

As noted earlier, the sparging system 370 is most efficient and removes oxygen quickly at oxygen concentrations in the fuel above ten parts per million. To reduce the oxygen concentration to levels lower than ten parts per million, the fuel must be exposed to the sparging gas for longer periods of time. These longer periods of time result in larger sizes, and thus weight, of the sparging system 370, such as larger sizes of the contactor 374. By using the oxygen gettering assembly 310 in conjunction with the sparging system 370, the size of the sparging system 370, and thus the weight of the deoxygenation system 300 can be minimized and the oxygen concentrations in the fuel reduced to concentrations as low as a one-half ppm or lower. In addition, mechanical oxygen removal systems, such as the sparging system 370 may be limited in the types of oxygen that the system can remove, but the oxygen getter has the ability to remove oxygen that is in other forms within the fuel. For example, the sparging system 370 may only remove dissolved oxygen, but the oxygen getter, as part of the oxygen gettering assembly 310, may also remove oxygen bound as compounds as well as dissolved oxygen.

In the deoxygenation system 300 shown in FIG. 4, the sparging system 370 and the oxygen gettering assembly 310 are arranged in series with the oxygen gettering assembly 310 being positioned downstream of the sparging system 370. More specifically, the oxygen gettering assembly 310 and the oxidation product removal assembly 360, if used, may be part of the fuel conduit 204 of the fuel delivery assembly 202 downstream of the sparging system 370. Other suitable arrangements of the deoxygenation system 300, however, may be used. FIGS. 6 to 10 show other arrangements of the deoxygenation system 300.

Figure 6:
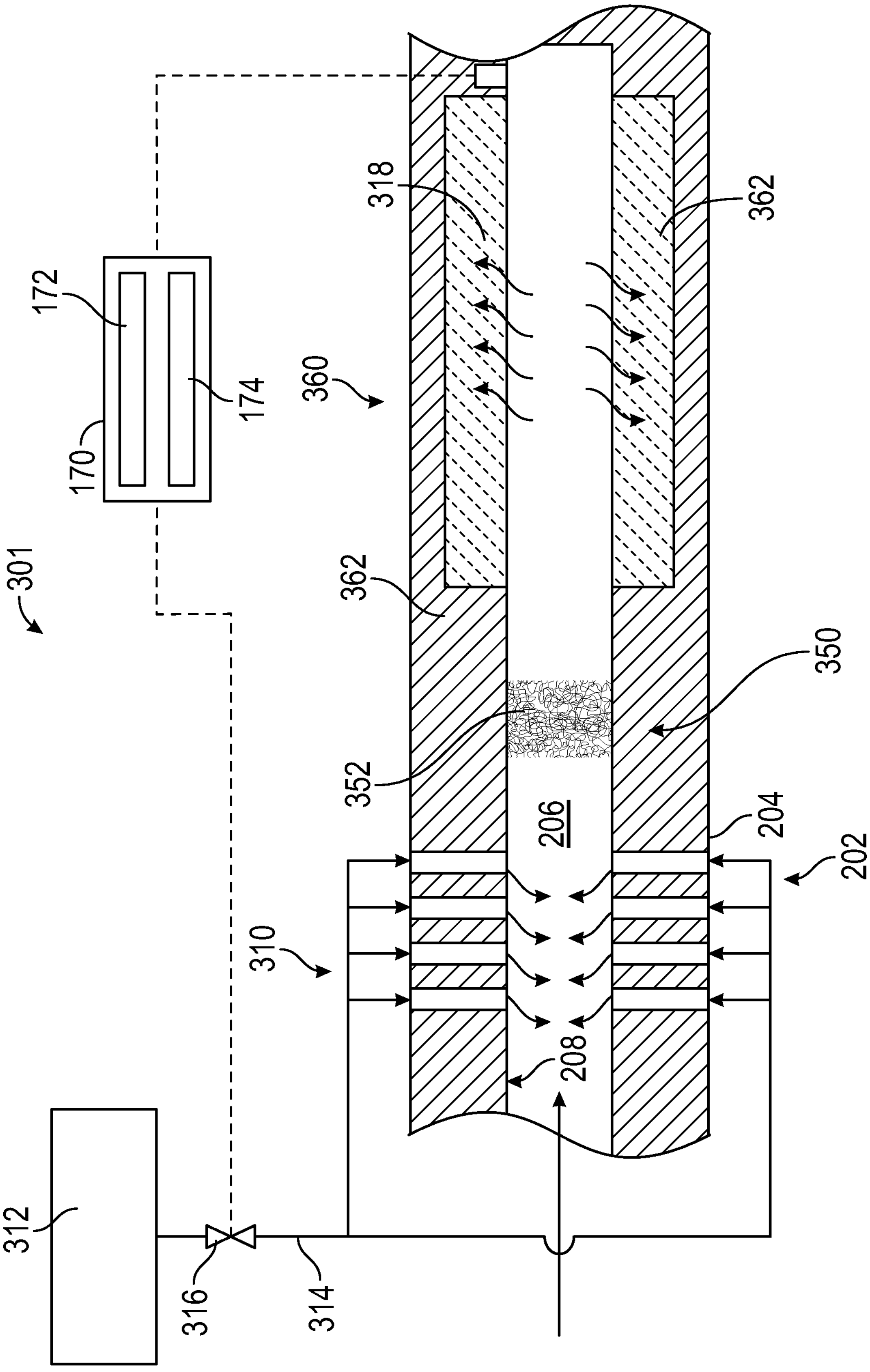
FIG. 6 is a schematic partial cross-sectional view of a deoxygenation system according to another embodiment of the present disclosure that may be used in the fuel system shown in FIG. 3.

FIG. 6 is a schematic partial cross-sectional view of a deoxygenation system 301 according to another embodiment of the present disclosure that may be used in the fuel system shown in FIG. 3. The deoxygenation system 301 of this embodiment is similar to the deoxygenation system 300 discussed above with reference to FIG. 4. The same reference numerals will be used for components of the deoxygenation system 301 of this embodiment that are the same as or similar to the components of the deoxygenation system 300 discussed above. The description of these components above also applies to this embodiment, and a detailed description of these components is omitted here.

The deoxygenation system 301 of this embodiment includes a plurality of oxygen gettering assemblies. The deoxygenation system 301 shown in FIG. 6 includes a first oxygen gettering assembly (oxygen gettering assembly 310) and a second oxygen gettering assembly (oxygen gettering assembly 350). The oxygen gettering assembly 310 of FIG. 4 and the oxygen gettering assembly 350 of FIG. 5E is shown in FIG. 6 as the first oxygen gettering assembly and the oxygen gettering assembly, respectively, but any of the configurations described in FIGS. 4 to 5E may be used as any oxygen gettering assembly of the plurality of oxygen gettering assemblies. The plurality of oxygen gettering assemblies are preferably arranged in series relative to the flow of fuel through the fuel passage 206. The plurality of oxygen gettering assemblies are preferably positioned upstream of the oxidation product removal assembly 360, and may be positioned downstream of the sparging system

370 or in the arrangements discussed below with respect to FIGS. 7 to 10. With the plurality of oxygen gettering assemblies arranged in series, the first oxygen gettering assembly (oxygen gettering assembly 310) reduces the oxygen concentration to a first oxygen concentration, and the second oxygen gettering assembly (oxygen gettering assembly 350) reduces the oxygen concentration to a second oxygen concentration less than the first oxygen concentration.

Preferably, the first oxygen gettering assembly (oxygen gettering assembly 310) is a different configuration than the second oxygen gettering assembly (oxygen gettering assembly 350). For example, the oxygen getter used in the first oxygen gettering assembly (oxygen gettering assembly 310) may be different, such as a different composition or a different form, than the oxygen getter used in the second oxygen gettering assembly (oxygen gettering assembly 350). In the embodiment shown in FIG. 6, the oxygen getter used in the first oxygen gettering assembly (oxygen gettering assembly 310) is an organic oxygen getter in a liquid form, and the oxygen getter used in the second oxygen gettering assembly (oxygen gettering assembly 350) is an inorganic oxygen getter in a solid form.

Figure 7:
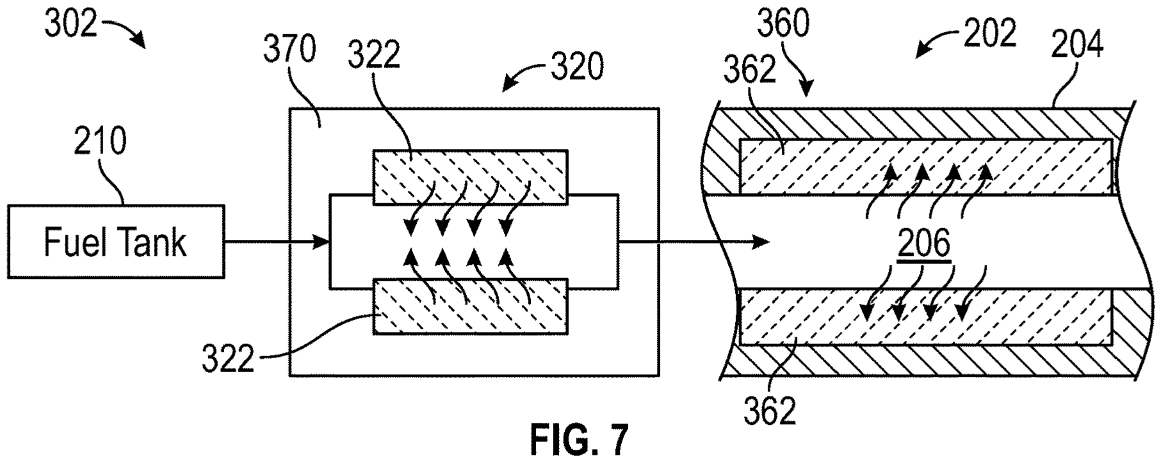
FIG. 7 is a schematic partial cross-sectional view of a deoxygenation system according to another embodiment of the present disclosure that may be used in the fuel system shown in FIG. 3.

FIG. 7 is a schematic partial cross-sectional view of a deoxygenation system 302 according to another embodiment of the present disclosure that may be used in the fuel system shown in FIG. 3. The deoxygenation system 302 of this embodiment is similar to the deoxygenation system 300 discussed above with reference to FIG. 4. The same reference numerals will be used for components of the deoxygenation system 302 of this embodiment that are the same as or similar to the components of the deoxygenation system 300 discussed above. The description of these components above also applies to this embodiment, and a detailed description of these components is omitted here. The oxygen gettering assembly 320 is shown in FIG. 7, but any of the configurations described in FIGS. 4 to 5E may be used. In the embodiment shown in FIG. 7, the oxygen gettering assembly 320 is positioned as a component within the sparging system 370. The oxygen gettering assembly 320 and the sparging system 370 are thus co-located at the same position in the fuel delivery assembly 202 with the oxidation product removal assembly 360, if used, positioned downstream of the sparging system 370 and oxygen gettering assembly 320. More specifically, the oxidation product removal assembly 360 may be part of the fuel conduit 204 of the fuel delivery assembly 202 downstream of the sparging system 370. Details of the sparging system 370 are omitted from FIG. 7, but the discussion of the sparging system 370 also applies here.

Figure 8:
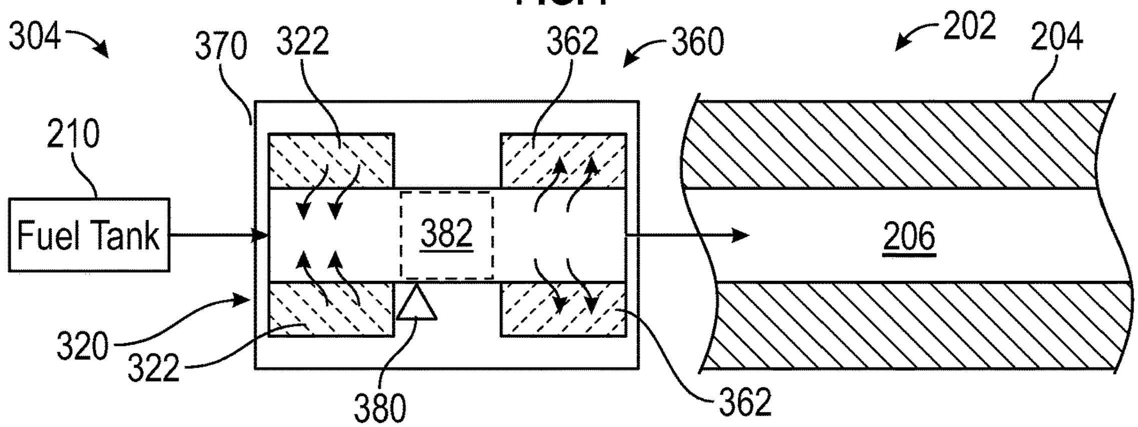
FIG. 8 is a schematic partial cross-sectional view of a deoxygenation system according to another embodiment of the present disclosure that may be used in the fuel system shown in FIG. 3.

FIG. 8 is a schematic partial cross-sectional view of a deoxygenation system 304 according to another embodiment of the present disclosure that may be used in the fuel system shown in FIG. 3. The deoxygenation system 304 of this embodiment is similar to the deoxygenation system 302 discussed above with reference to FIG. 7. The same reference numerals will be used for components of the deoxygenation system 304 of this embodiment that are the same as or similar to the components of the deoxygenation system 302 discussed above. The description of these components above also applies to this embodiment, and a detailed description of these components is omitted here. The oxygen gettering assembly 320 is shown in FIG. 8, but any of the configurations described in FIGS. 4 to 5E may be used. In the embodiment shown in FIG. 8, the oxidation product removal assembly 360 is also positioned as a component within the sparging system 370, and the oxidation product removal assembly 360 and the sparging system 370 are thus co-located at the same position in the fuel delivery assembly 202. The oxidation product removal assembly 360 is positioned downstream of the oxygen gettering assembly 320.

The deoxygenation system 300 of this embodiment also includes a heater 380 that is positioned upstream of the oxidation product removal assembly 360 to heat the fuel flowing through the fuel passage 206 before the fuel comes into contact with the oxidation product remover. The heater 380 may be positioned upstream or downstream of the oxygen gettering assembly 320. As noted above, the oxygen getter preferably does not spontaneously oxidize, but rather oxidizes (forms oxidation products) at elevated temperature (above an activation temperature). The activation temperature is a temperature at which the oxygen getter forms oxidization products from oxygen in the fuel at a kinetically significant rate. The heater 380 is used to heat the fuel having the oxygen getter to the activation temperature to activate the oxygen getter and to promote the formation of oxidation products to remove oxygen from the fuel. Preferably, the heater 380 is positioned far enough upstream of the oxidation product removal assembly 360 to allow this reaction to occur. Accordingly, the heater 380 is positioned upstream of the oxidation product removal assembly 360 with an oxidation reaction region 382 of the fuel passage 206 positioned there between.

In systems where the oxygen gettering assembly 320 and/or the oxidation product removal assembly 360 are downstream of the sparging system 370, the heater 380 can be omitted as the sparging system 370 may heat the fuel to the activation temperature. The heater 380 may thus be preferably used in embodiments where the oxygen gettering assembly 320 and oxidation product removal assembly 360 are part of the sparging system 370. In some embodiments, the activation temperature may be from one hundred seventy degrees Fahrenheit to three hundred degrees Fahrenheit, as discussed above.

Figure 9:
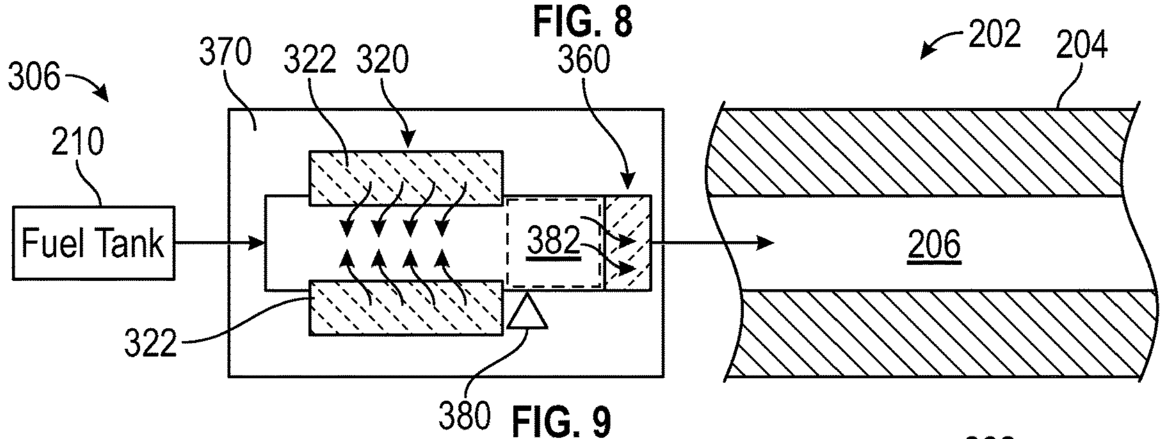
FIG. 9 is a schematic partial cross-sectional view of a deoxygenation system according to another embodiment of the present disclosure that may be used in the fuel system shown in FIG. 3.

FIG. 9 is a schematic partial cross-sectional view of a deoxygenation system 306 according to another embodiment of the present disclosure that may be used in the fuel system shown in FIG. 3. The deoxygenation system 306 of this embodiment is similar to the deoxygenation system 304 discussed above with reference to FIG. 8. The same reference numerals will be used for components of the deoxygenation system 306 of this embodiment that are the same as or similar to the components of the deoxygenation system 304 discussed above. The description of these components above also applies to this embodiment, and a detailed description of these components is omitted here. The oxygen gettering assembly 320 is shown in FIG. 9, but any of the configurations described in FIGS. 4 to 5E may be used. As noted above, the oxidation product removal assembly 360 can be configured in different ways. In the embodiment shown in FIG. 8, the oxygen product remover is positioned in an around configuration (around the fuel passage 206), but, in FIG. 9, the oxygen product remover is positioned in an in-line configuration within the fuel passage 206 such that the fuel flows through the oxidation product removal assembly 360.

Figure 10:
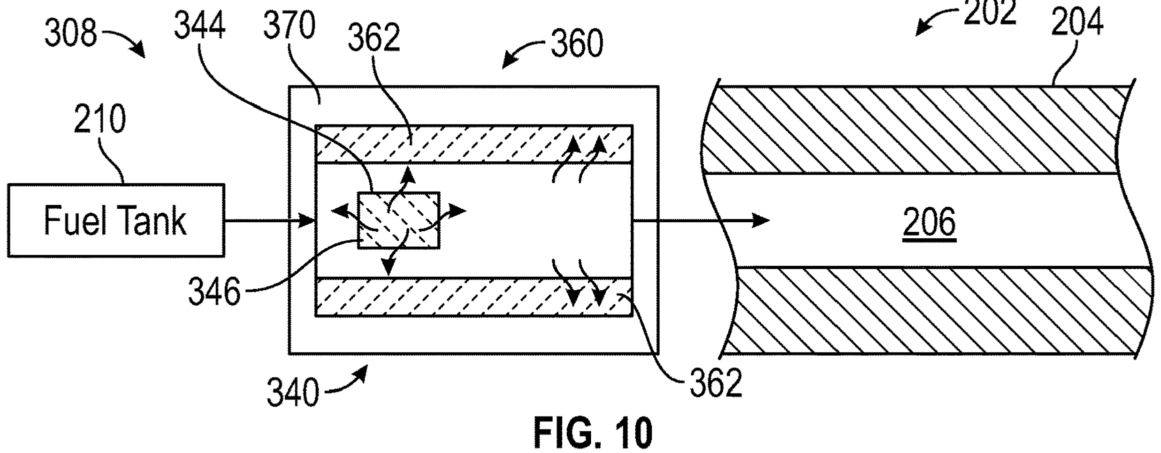
FIG. 10 is a schematic partial cross-sectional view of a deoxygenation system according to another embodiment of the present disclosure that may be used in the fuel system shown in FIG. 3.

FIG. 10 is a schematic partial cross-sectional view of a deoxygenation system 308 according to another embodiment of the present disclosure that may be used in the fuel system shown in FIG. 3. The deoxygenation system 306 of this embodiment is similar to the deoxygenation system 304 discussed above with reference to FIG. 8. The same reference numerals will be used for components of the deoxygenation system 306 of this embodiment that are the same as or similar to the components of deoxygenation system 304 discussed above. The description of these components above also applies to this embodiment, and a detailed description of these components is omitted here. In the embodiment shown in FIG. 8, the oxygen getter is positioned in an around configuration (around the fuel passage 206), but, in FIG. 10, the oxygen getter is positioned in an in-line configuration within the fuel passage 206 such that the fuel flows through the oxygen getter. The oxygen gettering assembly 340 discussed above with reference to FIG. 5D is shown in FIG. 10, but, other in-line oxygen gettering assemblies may be used. As noted above, the housing 344 may be various suitable permeable housings, and, in this embodiment, the housing 344 may be a sack or a pouch, which is suspended in the fuel. In the embodiment shown in FIG. 10, the oxygen product remover is positioned in an around configuration (around the fuel passage 206) including around the oxygen getter (housing 344), but again other configurations of the oxygen product remover may be used.

The deoxygenation systems 300, 301, 302, 304, 306, and 308 discussed herein are shown and described as being part of a fuel system to remove oxygen from a fuel. The deoxygenation systems 300, 301, 302, 304, 306, and 308 discussed herein may however, be used to remove oxygen from other hydrocarbon fluids, such as oil, and may be used in other hydrocarbon fluid systems, such as a lubrication oil system. Accordingly, the fuel conduit 204 and the fuel passage 206 through which the fuel flows are specific examples of a hydrocarbon fluid conduit that has a fluid passage through which the hydrocarbon fluid flows.

Further aspects of the present disclosure are provided by the subject matter of the following clauses.

A hydrocarbon fluid system including a hydrocarbon fluid conduit having a fluid passage through which hydrocarbon fluid flows and an oxygen gettering assembly. The hydrocarbon fluid includes oxygen and has an oxygen content. The oxygen gettering assembly includes an oxygen getter to reduce the oxygen content of the hydrocarbon fluid. The oxygen gettering assembly is disposed relative to the hydrocarbon fluid conduit such that the oxygen getter comes into contact with the hydrocarbon fluid as the hydrocarbon fluid flows through the fluid passage.

The hydrocarbon fluid system of the preceding clause, the oxygen getter being replaceable.

The hydrocarbon fluid system of any preceding clause, the oxygen getter being located in a replaceable cartridge.

The hydrocarbon fluid system of any preceding clause, the fluid passage includes a periphery, and the oxygen gettering assembly being disposed to position the oxygen getter around the periphery of the fluid passage.

The hydrocarbon fluid system of any preceding clause, the hydrocarbon fluid conduit includes an inner surface facing the fluid passage, the inner surface being the periphery of the fluid passage, and the oxygen getter being formed as a layer on the inner surface of the hydrocarbon fluid conduit.

The hydrocarbon fluid system of any preceding clause, the oxygen gettering assembly includes a liquid storage chamber containing the oxygen getter in a liquid form.

The hydrocarbon fluid system of any preceding clause, the oxygen gettering assembly includes a membrane separating the liquid storage chamber from the fluid passage, the membrane being permeable to the oxygen getter to allow a controlled release of the oxygen getter into the hydrocarbon fluid in the fluid passage.

The hydrocarbon fluid system of any preceding clause, the liquid storage chamber being fluidly coupled to the fluid passage to add the oxygen getter to the hydrocarbon fluid in the fluid passage as an additive.

The hydrocarbon fluid system of any preceding clause, the liquid storage chamber being fluidly coupled to the fluid passage to add the oxygen getter to the hydrocarbon fluid at a set release rate.

The hydrocarbon fluid system of any preceding clause, the liquid storage chamber being fluidly coupled to the fluid passage with a flow control device positioned between the liquid storage chamber and the fluid passage to adjust the release rate of the oxygen getter into the hydrocarbon fluid.

The hydrocarbon fluid system of any preceding clause, further comprising a controller operatively coupled to the flow control device.

The hydrocarbon fluid system of any preceding clause, further comprising an oxygen sensor positioned downstream of the hydrocarbon fluid conduit, the oxygen sensor being configured to measure the oxygen concentration in the hydrocarbon fluid within the fluid passage, the controller being communicatively coupled to the oxygen sensor to receive oxygen concentration information from the oxygen sensor and the controller being configured to control the release rate of the oxygen based on the oxygen concentration information received from the oxygen sensor.

The hydrocarbon fluid system of any preceding clause, the oxygen gettering assembly being disposed to position the oxygen getter within the fluid passage.

The hydrocarbon fluid system of any preceding clause, the oxygen gettering assembly includes a plurality of fibers of the oxygen getter, the plurality of fibers being intertwined with each other.

The hydrocarbon fluid system of any preceding clause, the oxygen gettering assembly includes a housing forming a storage chamber, the oxygen getter being located within the storage chamber.

The hydrocarbon fluid system of any preceding clause, at least a portion of the housing being permeable allowing the hydrocarbon fluid to flow through the oxygen getter.

The hydrocarbon fluid system of any preceding clause, the oxygen getter being a powder.

The hydrocarbon fluid system of any preceding clause, further comprising an oxidation product removal assembly positioned, at least partially, downstream of the oxygen gettering assembly, the oxygen getter producing oxidation products within the hydrocarbon fluid, and the oxidation product removal assembly including an oxidation product remover to remove the oxidation products from the hydrocarbon fluid.

The hydrocarbon fluid system of any preceding clause, further comprising a heater to heat the hydrocarbon fluid to an activation temperature, the heater being positioned upstream of the oxidation product removal assembly.

The hydrocarbon fluid system of any preceding clause, the oxidation product removal assembly being disposed to position the oxidation product remover within the fluid passage.

The hydrocarbon fluid system of any preceding clause, the fluid passage includes a periphery, and the oxidation product removal assembly being disposed to position the oxidation product remover around the periphery of the fluid passage.

The hydrocarbon fluid system of any preceding clause, the hydrocarbon fluid conduit includes an inner surface facing the fluid passage, the inner surface being the periphery of the fluid passage, and the oxidation product remover being formed as a layer on the inner surface of the hydrocarbon fluid conduit.

The hydrocarbon fluid system of any preceding clause, further comprising a deoxygenation system, the deoxygenation system including a first oxygen removal assembly and a second oxygen removal assembly each configured to remove oxygen from the hydrocarbon fluid, the oxygen gettering assembly being the second oxygen removal assembly.

The hydrocarbon fluid system of any preceding clause, the first oxygen removal assembly is a sparging system.

The hydrocarbon fluid system of any preceding clause, the sparging system includes a sparging gas source fluidly connected to the fluid passage to introduce a sparging gas to the hydrocarbon fluid.

The hydrocarbon fluid system of any preceding clause, the sparging system being configured to reduce the oxygen concentration in the hydrocarbon fluid to a first concentration and the oxygen gettering assembly being configured to reduce the oxygen concentration in the hydrocarbon fluid to a second concentration less than the first concentration.

The hydrocarbon fluid system of any preceding clause, the sparging system being positioned upstream of the oxygen gettering assembly.

The hydrocarbon fluid system of any preceding clause, the oxygen gettering assembly being located within the sparging system.

The hydrocarbon fluid system of any preceding clause, further comprising an oxidation product removal assembly positioned, at least partially, downstream of the oxygen gettering assembly, the oxygen getter producing oxidation products within the hydrocarbon fluid, and the oxidation product removal assembly including an oxidation product remover to remove the oxidation products from the hydrocarbon fluid.

The hydrocarbon fluid system of any preceding clause, the sparging system being positioned upstream of the oxidation product removal assembly.

The hydrocarbon fluid system of any preceding clause, the oxidation product removal assembly being located within the sparging system.

The hydrocarbon fluid system of any preceding clause, the oxygen gettering assembly being a first oxygen gettering assembly and the hydrocarbon fluid system further comprises a second oxygen gettering assembly including an oxygen getter to reduce the oxygen content of the hydrocarbon fluid, the second oxygen gettering assembly being disposed relative to the hydrocarbon fluid conduit such that the oxygen getter comes into contact with the hydrocarbon fluid as the hydrocarbon fluid flows through the fluid passage.

The hydrocarbon fluid system of any preceding clause, the first oxygen gettering assembly and the second oxygen gettering assembly are positioned in series with the second oxygen gettering assembly being downstream of the first oxygen gettering assembly.

The hydrocarbon fluid system of any preceding clause, the first oxygen gettering assembly and the second oxygen gettering assembly are positioned in series with the second oxygen gettering assembly being downstream of the first oxygen gettering assembly.

The hydrocarbon fluid system of any preceding clause, the first oxygen gettering assembly being a different configuration than the second oxygen gettering assembly.

The hydrocarbon fluid system of any preceding clause, the oxygen getter of the first oxygen gettering assembly being a different composition than the oxygen getter of the second oxygen gettering assembly.

The hydrocarbon fluid system of any preceding clause, the oxygen getter of the first oxygen gettering assembly being an organic oxygen getter, and the oxygen getter of the second oxygen gettering assembly being an inorganic oxygen getter.

The hydrocarbon fluid system of any preceding clause, the oxygen getter of the first oxygen gettering assembly being a different form than the oxygen getter of the second oxygen gettering assembly.

The hydrocarbon fluid system of any preceding clause, the oxygen getter of the first oxygen gettering assembly being a liquid, and the oxygen getter of the second oxygen gettering assembly being a solid.

The hydrocarbon fluid system of any preceding clause, the hydrocarbon fluid being fuel and the hydrocarbon fluid system being a fuel system.

The fuel system of the preceding clause, further comprising a fuel metering unit configured fluidly connected to the hydrocarbon fluid conduit to meter a flow of the fuel and a plurality of fuel nozzles fluidly connected to the fuel metering unit to receive fuel from the fuel metering unit.

The fuel system of any preceding clause, further comprising a heat exchanger fluidly connected to the fuel metering unit upstream of the plurality of fuel nozzles and downstream of the fuel metering unit to receive the flow of the fuel the heat exchanger being configured to heat the fuel and to provide the heated fuel to the plurality of fuel nozzles.

A gas turbine engine comprises the fuel system of any preceding clause, a compressor section configured to compress air to generate compressed air, a combustor including a combustion chamber, the plurality of fuel nozzles being configured to inject the fuel into the combustion chamber, the combustor being configured to mix the compressed air with the fuel to form a fuel and air mixture, and to combust the fuel and air mixture to generate combustion products, and a turbine section configured to receive the combustion products, the turbine section having at least one turbine configured to be driven by the combustion products.

A method of regenerating an oxygen getter in a hydrocarbon fluid system. The method includes flowing a regenerating fluid through a fluid passage of a hydrocarbon fluid conduit, and exposing an oxygen getter of an oxygen gettering assembly to the regenerating fluid. The oxygen gettering assembly being disposed relative to the hydrocarbon fluid conduit such that the oxygen getter comes into contact with the hydrocarbon fluid as the hydrocarbon fluid flows through the fluid passage.

The method of the preceding clause, the oxygen getter being a metallic oxygen getter.

The method of any preceding clause, the hydrocarbon fluid conduit includes an inner surface facing the fluid passage, the inner surface being the periphery of the fluid passage, and the oxygen getter being formed as a layer on the inner surface of the hydrocarbon fluid conduit.

The method of any preceding clause, the regenerating fluid being a fluid that creates a reducing environment when the oxygen getter being exposed to the regenerating fluid.

The method of any preceding clause, the regenerating fluid being hydrogen gas.

The method of any preceding clause, the oxygen gettering assembly being disposed to position the oxygen getter within the fluid passage.

The method of any preceding clause, the oxygen gettering assembly includes a plurality of fibers of the oxygen getter, the plurality of fibers being intertwined with each other.

The method of any preceding clause, the oxygen gettering assembly includes a housing forming a storage chamber, the oxygen getter being located within the storage chamber.

The method of any preceding clause, at least a portion of the housing being permeable allowing the regenerating fluid to flow through the oxygen getter.

The method of any preceding clause, the oxygen getter being a powder.

Although the foregoing description is directed to the preferred embodiments, other variations and modifications will be apparent to those skilled in the art and may be made without departing from the spirit or the scope of the disclosure. Moreover, features described in connection with one embodiment may be used in conjunction with other embodiments, even if not explicitly stated above.

The invention claimed is:

1. A fuel system comprising:

a hydrocarbon fluid conduit extending in a longitudinal direction and having a fluid passage through which hydrocarbon fluid flows, the hydrocarbon fluid being fuel and including oxygen and having an oxygen content;

an oxygen gettering assembly including an oxygen getter to reduce the oxygen content of the hydrocarbon fluid, the oxygen gettering assembly being disposed relative to the hydrocarbon fluid conduit such that the oxygen getter comes into contact with the hydrocarbon fluid as the hydrocarbon fluid flows through the oxygen gettering assembly via a portion of the fluid passage, the oxygen getter producing oxidation products within the hydrocarbon fluid, wherein the oxygen getter has an activation temperature at which the oxygen getter produces the oxidation products, the activation temperature being from one hundred seventy degrees Fahrenheit to three hundred degrees Fahrenheit;

an oxidation product removal assembly positioned, at least partially, downstream of the oxygen gettering assembly to receive the hydrocarbon fluid containing the oxidation products produced by the oxygen getter, the oxidation product removal assembly including an oxidation product remover disposed such that the oxidation product remover comes into contact with the hydrocarbon fluid to physically remove the oxidation products from the hydrocarbon fluid and;

wherein the oxygen gettering assembly is disposed to longitudinally align with the hydrocarbon fluid conduit, such that the hydrocarbon fluid enters the oxygen gettering assembly via an inlet of the portion of the fluid passage in the longitudinal direction, continuously flows in the longitudinal direction from the inlet of the portion of the fluid passage to an outlet of the portion of the fluid passage, and exits the oxygen gettering assembly via the outlet of the portion of the fluid passage in the longitudinal direction.

2. The fuel system of claim 1, wherein the oxygen getter is located in a replaceable cartridge.

3. The fuel system of claim 1, wherein the portion of the fluid passage includes a periphery, and the oxygen gettering assembly is disposed to position the oxygen getter around the periphery of the portion of the fluid passage.

4. The fuel system of claim 1, wherein the oxygen gettering assembly includes a liquid storage chamber containing the oxygen getter in a liquid form.

5. The fuel system of claim 4, wherein the oxygen gettering assembly includes a membrane separating the liquid storage chamber from the portion of the fluid passage, the membrane being permeable to the oxygen getter to allow a controlled release of the oxygen getter into the hydrocarbon fluid in the portion of the fluid passage.

6. The fuel system of claim 4, wherein the liquid storage chamber is fluidly coupled to the portion of the fluid passage to add the oxygen getter to the hydrocarbon fluid in the portion of the fluid passage as an additive.

7. The fuel system of claim 1, further comprising a heater to heat the hydrocarbon fluid to the activation temperature, the heater being positioned upstream of the oxidation product removal assembly.

8. The fuel system of claim 1, wherein the oxidation product removal assembly is disposed to position the oxidation product remover within a second portion of the fluid passage downstream from the portion of the fluid passage.

9. The fuel system of claim 1, further comprising a deoxygenation system, the deoxygenation system including a first oxygen removal assembly and a second oxygen removal assembly each configured to remove oxygen from the hydrocarbon fluid, the oxygen gettering assembly together with the oxidation product removal assembly being the second oxygen removal assembly.

10. The fuel system of claim 9, wherein the first oxygen removal assembly is a sparging system.

11. The fuel system of claim 10, wherein the sparging system is positioned upstream of the oxygen gettering assembly.

12. The fuel system of claim 10, wherein the oxygen gettering assembly is located within the sparging system.

13. The fuel system of claim 1, wherein the oxidation product remover is a porous material.

* * * * *